3,560,237
PROCESS OF CURING POLYMERIZABLE RESINS HAVING TERMINAL VINYL ESTER GROUPS USING HIGH ENERGY ELECTRONS
Lewis S. Miller, Bellevue, Wash., assignor to Weyerhaeuser Company, Tacoma, Wash.
No Drawing. Filed Apr. 15, 1968, Ser. No. 721,152
Int. Cl. B44d 1/50
U.S. Cl. 117—93.31                18 Claims

ABSTRACT OF THE DISCLOSURE

A process of coating a porous or nonporous substrate with a liqjuid polymerizable film and subjecting the coated substrate to ionizing radiation sufficient to impart to the coating composition a dose of from 1 to 10 megarads in one second or less. The coating compositions, capable of substantially complete polymerization in less than one second, contain undiluted vinyl ester resins having terminal vinyl ester groups, or the above dissolved in vinyl monomers. The vinyl ester resins are made by reacting:

(1) A polyfunctional material selected from the group consisting of (a) dicarboxylic acids having from 4 to 15 carbon atoms, (b) polyepoxides having terminal, reactive glycidyl groups, (c) polyfunctional isocyanates having terminal, reactive isocyanate groups, or (d) dicarboxylic acid esters of polyepoxides, polyamines, polyisocyanates, with
(2) 2-hydroxyalkyl acrylates or methacrylates.

Particularly useful are coating compositions containing resins having terminal acrylate groups and an acrylate monomer, the polyfunctional acrylate having more than one 2-oxyalkylacrylate end group per molecule with the end groups being joined by a hydrophobic molecule such as a dicarboxylic acid, polyfunctional isocyanate or polyepoxide.

BACKGROUND OF THE INVENTION (1) Field of the invention

This invention relates to a process of curing coating compositions having terminal unsaturation in a very short amount of time using high energy electrons.

(2) Description of the prior art

It is known that many polymeric materials, when subjected to high energy radiation in the form of high energy electrons, can be rapidly cured. Electron irradiation has a number of distinct advantages over conventional methods of polymerization and cross-linking using catalytic agents, especially when used to cure coatings on wood and wood products, fabrics, rubber, glass, and other similar substrates. Use of electron irradiation to cure polymeric coatings avoids the sometimes lengthy induction period associated with catalyst-induced cure, enables the use of polymeric coating compositions having indefinite pot life, produces little temperature rise during polymerization, and produces, in many cases, a superior coating-to-substrate bond.

One of the problems associated with electron irradiation is in finding a polymeric material which is suitable for the purpose desired and curable to a hard, tack-free condition in a short amount of time. With particular reference to the coating of wood and wood products, it is desirable to have a coating composition which is flexible, water resistant, and impact resistant. In addition, it is necessary that the polymeric composition cure or polymerize in a short amount of time at reasonable dose rates in order to make the process economically feasible.

To obtain fast curing a cross-linking mechanism is needed. In the present coating composition this is furnished by acrylates. It is known that diacrylates made by reacting polyhydric alcohols, such as ethylene glycol, with acrylic or methacrylic acids are curable by high energy radiation, as disclosed in U.S. Pat. No. 2,921,006. The diacrylates disclosed, however, do not cure to a hard tack free state using economically feasible dose rates, are too brittle, and swell on exposure to moisture and weathering, making them unacceptable for coating wood and wood products. Other polyester coating materials curable by high energy radiation are disclosed in U.S. Pat. No. 3,247,012. These compositions also lack certain desired properties, making them unacceptable for coating of wood and wood products.

SUMMARY OF THE INVENTION

This invention is directed to a process for coating a substrate with a composition containing a polymerizable material having terminal vinyl ester groups and thereafter subjecting the coating to high energy ionizing radiation in the form of electrons to cure the coating to a tack-free condition in times of one second or less. It was entirely unexpected that these polymerizable compounds could be cured with high energy electrons at reasonable dose rates in such a short amount of time. Further, this invention is directed to a process of coating wood and wood products with vinyl ester resins which, on curing, have good flexibility, excellent water resistance, and excellent impact resistance. The vinyl ester resins of this invention can be used undiluted or dissolved in 0 to 50% by weight of a vinyl monomer. Pigments and other conventional additives can be added to the coating compositions. Vinyl ester resins made by reacting:

(1) A polyfunctional material selected from the group consisting of (a) dicarboxylic acids having from 4 to 15 carbon atoms, (b) polyepoxides having terminal, reactive glycidyl groups, (c) polyfunctional isocyanates having terminal, reactive isocyanate groups, or (d) dicarboxylic acid esters of polyepoxides, polyamines, or polyisocyanates, with
(2) 2-hydroxylalkyl acrylates or methacrylates are suitable in the process of this invention.

Using compounds of this type cure rates of less than ⅓ second at a dose rate of 3 megarads have been obtained.

DESCRIPTION OF THE PREFERRED EMBODIMENTS

Polymerizable vinyl ester resins described previously are liquids which may be used undiluted or dissolved in vinyl monomers which copolymerize with the vinyl ester resin upon subjection to irradiation. These resinous compositions are made by reacting 2-hydroxyalkyl acrylates with polyfunctional, hydrophobic materials. The polyfunctional hydrophobic group may be (1) an aliphatic, saturated dicarboxylic acid having from 4 to 14 carbon atoms, such as propanedioic acid (malonic acid), butanedioic acid (succinic acid), pentanedioic acid (sebacic aid), hexanedioic acid (adipic acid), octanedioic acid (suberic acid); (2) aromatic dicarboxylic acids such as phthalic acid; (3) a conventional epoxide compound having a 1,2-epoxy equivalency greater than 1 and having more than one epoxy group per molecule, for example, bis phenol A diglycidyl ether of other epoxy compounds obtained by reacting dihydric phenols with polyfunctional etherifying agents such as epichlorohydrin (described more fully in U.S. Pats. 2,467,171; 2,538,072; 2,582,985; 2,615,007; and 2,698,315); (4) an epoxy compound reacted with a dibasic acid or anhydride, such as maleic acid or anhydride, salicylic acid or anhydride, fumaric acid, itaconic acid, phthalic acid or anhydride, an aliphatic, saturated dicarboxylic acid having from 4 to 15 carbon atoms; (5) polyurethane prepolymers made by reacting an organic polyfunctional isocyanate, for example, toluene diisocyanate, with polyols such as propylene or polypropylene glycol or polyether polyols; and (6) organic polyfunctional isocyanates including aromatic, aliphatic, aralkyl, alkaryl and cycloaliphatic polyfunctional isocyanates. More specifically, vinyl ester resins disclosed in U.S. Pat. No. 3,367,992, which is hereby incorporated by reference, are applicable in the process of this invention. Specific examples of these materials include adipoyl-bis (2-oxyethylacrylate); the condensation product of 2-hydroxyethyl acrylate, maleic anhydride, and bis-phenol A diglycidyl ether; the condensation product of polypropylene glycol, toluene diisocyanate, and 2-hydroxyethylacrylate; the condensation product of 2-hydroxypropyl acrylate, maleic anhydride, and butanediol diglycidyl ether; the condensation product of 2-hydroxyethyl acrylate, maleic anhydride and a brominated bisphenol A-based polyepoxide resin with an epoxide equivalent weight of 350–400; the condensation product of 2-hydroxypropyl acrylate, maleic anhydride, a bisphenol A-based polyepoxide having an epoxide equivalent weight of 186–192, and phthalic anhydride; and the like. These compounds are prepared by condensing 0.8 to 1.2 gram molecular proportions of the polyfunctional hydrophobic group per 1.8 to 2.5 gram molecular proportions of the 2-hydroxylalkyl acrylate or methacrylate in the absence of a solvent.

The vinyl ester resin or resins may be spread on the substrate undiluted or dissolved in up to 50% by weight of a vinyl monomer. Preferably an acrylate monomer is used in combination with the vinyl ester compounds to achieve optimum results. Small amounts of styrene, vinyl toluene, t-butyl styrene, chlorostyrene, hydroxyalkyl methacrylates or alkyl methacrylates having 1 to 8 carbon atoms may be used in admixture with the acrylate monomer; however, the presence of too great a quantity of the above compounds lowers the cure rate significantly and affects the properties of the cured coating.

Acrylate monomers which may be used include alkyl acrylates having from 1 to 8 carbon atoms, hydroxyalkyl acrylates, cycloalkyl acrylates, or glycidyl acrylates, such as acrylic acid, 2-hydroxyethyl acrylate, 2-hydroxypropyl acrylate, glycidyl acrylate, cyclohexylacrylate, diacetonacrylamide, and others. It is preferred to use an acrylate monomer, such as n-butyl acrylate, which is readily available, economical, and has a low volatility. The monomer, if used, should be added in an amount which does not thin the coating composition to an extent that it penetrates the substrate too rapidly, if a porous substrate is used. Also, additional of too much monomer impairs the properties of high impact and water resistance present furnished by reason of the polyfunctional acrylate or methacrylate composition. Preferably, amounts up to 40% by weight or less are used.

The coating compositions as defined can be used to coat any suitable porous or nonporous substrate such as wood or wood products, plastics, glass, rubber, metals, etc. The properties of the resins are best utilized, however, in the coating of wood and wood products.

No solvent is necessary for the coating compositions. Polymerization of the coating composition is initiated and completed by ionizing radiation in the form of high energy electrons. To cure the coating composition, it is necessary to impart to the coating an ionizing radiation dose rate of from 1 to 10 megarads in 1 second or less. Generally, the electron beam is maintained in the range of 250,000–550,000 volts with sufficient milliampers per inch width of scan to impart 1 to 10 megrarads to the coating composition in 1 second or less. A number of commercially available high electron beam machines are available and can be used including those sold by General Electric Company, Radiation Dynamics (Dynacote), Texas Nuclear Company, and High Voltage Engineering (ICT 500). For example, using the High Voltage Engineering (ICT 500) machine operated at 300 kilovolts, 20 milliamperes and a beam scan of 18 inches width, the current density is 20/18 or 1.1 milliamperes per inch of width. As the substrate passes under the beam at a distance of, for example, 2½ inches below the window of the unit and at right angles to the scan, it is exposed to significant portions of the beam for a distance of about 4 inches. If the coated substrate is traveling at, for example, 60 feet per minute or 1 foot per second, it covers the 4 inches in ⅓ second. The exposure times in the examples were computed in such a manner.

Films of varying thickness can be cured depending on the voltage used. At about 300 kv. films ranging up to 12 mils in thickness can be easily cured. At about 500 kv. films up to 35 mils in thickness can be cured.

It is preferable to maintain a distance between the coated substrate and the window of the machine through which the electron beam passes from about 6 inches to the minimum necessary for clearance of the coated substrate.

Using certain coatings, cure in the presence of oxygen may leave a soft surface film on the coating. This may be prevented by conventional means such as using an inert atmosphere or irradiating the coated substrate under a covering film of release paper or plastic.

The coating compositions of this invention may be added to the substrate by spraying, dipping, brushing or any other suitable means. Clear coatings on hardwood surfaces having up to 35 mils in thickness have been made using curing times of 1 second and less with the resinous compositions of this invention. Such a fast cure rate is advantageous when the high energy radiation is used in a conventional coating line operating at speeds from 20 feet per minute to 100 feet per minute.

Pigments, dyes, and other suitable materials may be added to the resinous coating compositions if desired.

The following examples are given by way of illustration and are not intending to be limiting in any manner.

EXAMPLE I

A solution of 69.6 grams (0.6 mole) of 2-hydroxyethyl acrylate in 47.5 grams of pyridine and 150 ml. of benzene was placed in a flask equipped with a stirrer, dropping funnel and condenser. A solution of 54.9 grams (0.3 mole) of adipoyl chloride in 75 ml. of benzene was added with stirring and cooling. After the addition was complete, the mixture was heated one-half hour on a steam bath. The clear solution was decanted from the precipitate and passed through a column of activated alumina. After removing the benzene on a steam bath, 82.8 grams of a clear residue, adipoyl-bis(2-oxyethylacrylate) remained. A sample of wood and aluminum was given a 0.005 to 0.010 inch thick coating of the above resin composition and the coating covered with polyethylene terephthalate (Mylar) film 5 mils in thickness. The covered products were then passed under a two million volt electron beam from a Van deGraaff accelerator in a way that the samples received 1.7 megarads in 0.3 seconds. After removing the Mylar cover, a clear hard coating remained on the substrates which did not appreciably soften in water and was not cracked or crazed by a sharp hammer blow.

A subsequent coating on aluminum of the same material was irradiated with a 500,000 volt electron beam giving a dose rate of two megarads in 0.5 second. Again a hard film resulted.

EXAMPLE II

A very viscous, resinous material, the condensation product of 2-hydroxyethyl acrylate, maleic anhydride and bis phenol A diglycidyl ether was coated on wood and passed under the 500 kilovolt electron beam as in Example I. The resinous composition was cured in 0.5 seconds to a hard and moderately tough film. The top surface of the film exposed to air was not tacky.

EXAMPLE III

The resinous composition of Example II was dissolved in n-butyl acrylate in a ratio of 20 parts butyl acrylate to 80 parts resin. A piece of wood was coated with the resinous composition to a thickness of 0.005 inch and cured with a 300 kilovolt beam in 0.67 seconds to a hard and tough film. An 8-ounce steel ball dropped from a height of three feet onto the surface did not crack or craze the film. The top surface of the film exposed to air was slightly softer than the main film. Polishing this surface with carborundum dust removed this soft surface and left a hard, smooth surface with a reduction in film thickness of less than 0.001 inch.

Identical coatings cured in the same way but with a 5 mil Mylar film or 3 mil coated paper placed over the coated substrate had hard, cured surfaces.

EXAMPLE IV

In a glass stoppered flask, 20 parts of polypropylene glycol was mixed with 14.2 parts of toluene diisocyanate. The flask became warm from a mild exothermic reaction. After standing for one hour, 12.4 parts of 2-hydroxyethyl acrylate were added. After standing overnight, a clear viscous liquid remained. A thin film of this resinous material was coated on aluminum, a 5 mil Mylar film placed over the coated substrate, and the sample passed under a 300 kilovolt electron beam. The coating cured in 0.33 seconds to a very flexible, tough film which adhered strongly to the aluminum.

A solution of 90% of the above reaction product in 10% n-butyl acrylate gave a harder, very flexible film on curing under the 300 kilovolt electron beam for 0.67 seconds.

EXAMPLE V

One hundred grams of Vorite 63 (a castor polyester diisocyanate prepolymer made by The Baker Castor Oil Company), 43 grams of 2-hydroxyethyl acrylate and 0.14 grams of tin octoate catalyst were mixed in a 250 ml. rotating flask at 50° C. for 2½ hours. Free isocyanate in the final solution analyzed 0.02%. A 0.010 inch thick film of the product cured in about 0.67 seconds by irradiation under a 300 kv. electron beam to a dose of 7 megarads. A hard, impact resistant coating resulted. A solution of 11.3 parts product and 3.5 parts n-butyl acrylate gave a liquid which cured as above to a flexible, impact resistant film.

EXAMPLE VI

Five grams of "DDI diisocyanate" (an aliphatic long chain diisocyanate made by General Mills, Incorporated) was mixed with 1.93 grams of 2-hydroxyethyl acrylate and 0.04 grams of tin octoate at 90° C. for five minutes. Thin films of the product on aluminum and plywood were covered with Mylar film and irradiated to a dose of 7 megarads under a 300 kv. electron beam for about 0.67 seconds. The cured film was hard but very flexible.

Other resins, for example those described in U.S. Pat. 3,367,992 can also be cured in a short length of time with high energy electrons in the same manner as set forth in the above examples.

What is claimed is:
1. A method of coating a surface of a substrate with a flexible, impact resistant vinyl ester material comprising,
   (a) spreading over the surface of the substrate a liquid vinyl ester coating composition made by reacting:
      (1) a polyfunctional material selected from the group consisting of (a) dicarboxylic acids or acid chlorides having from 4 to 15 carbon atoms, (b) polyepoxides having terminal, reactive glycidyl groups, (c) polyisocyanates having terminal, reactive isocyanate groups, and (d) dicarboxylic acid esters of polyepoxides, with
      (2) 2-hydroxyalkyl acrylates or methacrylates; and
   (b) exposing for one second or less the liquid coating composition to a beam of electrons having energy and current density sufficient to impart to the coating composition an ionizing radiation dose of 1 to 10 megarads.
2. The method according to claim 1 wherein the coating composition includes 0 to 50% by weight of a vinyl monomer.
3. The method according to claim 2 wherein the coating composition includes 0 to 50% by weight of an acrylate monomer.
4. The method according to claim 3 wherein the acrylate monomer is an alkylacrylate having from 1 to 10 carbon atoms.
5. The method according to claim 3 wherein the acrylate monomer is diacetoneacrylamide.
6. The method according to claim 3 wherein the acrylate monomer is a cycloalkyl acrylate.
7. The method according to claim 1 wherein the liquid composition includes a pigment.
8. The method according to claim 1 wherein the liquid composition includes a dye.
9. The method according to claim 1 wherein the electron beam has an energy of at least 250,000 volts.
10. The method according to claim 1 wherein the liquid coating composition contains adipoyl-bis(2 - oxyethylacrylate) and up to 40% by weight of acrylate monomer.
11. The method according to claim 1 wherein the coating composition contains the condensation product of 2-hydroxyethyl acrylate, maleic anhydride, and a bis-phenol A polyepoxide, and up to 40% by weight of acrylate monomer.
12. The method according to claim 1 wherein the coating composition contains the condensation product of a polyglycol, a polyfunctional isocyanate and 2-hydroxyethylacrylate, and up to 40% by weight of acrylate monomer.
13. The method according to claim 1 wherein the substrate is wood.
14. A method as in claim 1 wherein the polyfunctional material comprises a dicarboxylic acid or acid chloride having from 4 to 15 carbon atoms.
15. A method as in claim 1 wherein the polyfunctional material comprises a polyepoxide having terminal reactive glycidyl groups.
16. A method as in claim 1 wherein the polyfunctional material comprises a polyisocyanate having terminal, reactive isocyanate groups.
17. A method as in claim 1 wherein the polyfunctional material comprises a dicarboxylic acid ester of a polyepoxide.

18. A method of coating a surface of a substrate with a flexible, impact resistant vinyl ester material comprising,
(a) spreading over the surface of the substrate a liquid vinyl ester coating composition comprising the condensation product of a 2-hydroxyalkyl acrylate, a dibasic acid anhydride, and a polyepoxide; and
(b) exposing for one second or less the liquid coating composition to a beam of electrons having energy and current density sufficient to impart to the coating composition an ionizing radiation dose of 1 to 10 megarads.

References Cited
UNITED STATES PATENTS
3,367,992   2/1968   Bearden _____ 260—837
3,437,514   4/1969   Burlant _____ 117—93.31

ALFRED L. LEAVITT, Primary Examiner

J. H. NEWSOME, Assistant Examiner

U.S. Cl. X.R.

117—148, 161; 204—159.19; 260—837

PO-1050
(5/69)

UNITED STATES PATENT OFFICE
CERTIFICATE OF CORRECTION

Patent No. 3,560,237          Dated February 2, 1971

Inventor(s) LEWIS S. MILLER

It is certified that error appears in the above-identified patent and that said Letters Patent are hereby corrected as shown below:

In column 1, line 14, "liqjuid" should read --liquid--;

in column 2, line 52, "2-hydroxylalkyl" should read --2-hydroxyalkyl--;

in column 3, line 12, "of" should read --or--;

in column 3, line 31, "adipoly-bis" should read --adipoyl-bis in column 3, line 47, "2-hydroxylalkyl" should read --2-hydroxyalkyl--; and in column 3, line 71, "additional" should read --addition--.

Signed and sealed this 29th day of June 1971.

(SEAL)
Attest:

EDWARD M. FLETCHER, JR.
Attesting Officer

WILLIAM E. SCHUYLER, JI
Commissioner of Patent: